March 12, 1957  L. J. ZARAVSEY  2,785,003
HOLD-DOWN CLIP DEVICES FOR VEHICLE CONVERTIBLE TOP COVERS
Filed Nov. 15, 1954

INVENTOR.
LOUIS J. ZARAVSEY
BY *Joseph G. Werner*

United States Patent Office 2,785,003
Patented Mar. 12, 1957

2,785,003

HOLD-DOWN CLIP DEVICES FOR VEHICLE CONVERTIBLE TOP COVERS

Louis J. Zaravsey, Madison, Wis.

Application November 15, 1954, Serial No. 468,623

2 Claims. (Cl. 296—107)

This invention relates to improvements in automobile convertible top constructions and is concerned more particularly with clip devices for securing the outer edges of the top to its side rails.

Among the objects of the invention are to provide means for quickly and easily attaching the outer edges of a convertible top to the top supporting frame or side rails; uniformly and evenly securing such edges to the supporting frame or side rails; providing an effective rain and weather proof connecting seal for such top edges; securing such edges in a manner so as not to interfere with the collapsibility of the top and its supporting frame or side rails; retaining such top edges securely under all operating conditions but at the same time permitting ready removal of the edges for replacement or repair of the top; and in general to provide improved, simplified, inexpensive and durable attachments for such convertible tops.

Other objects and advantages of the invention will be apparent from the following detailed explanation taken in conjunction with the accompanying drawings wherein a preferred embodiment of the principles of the invention has been selected for exemplification.

Referring more particularly to the drawings, wherein like numerals refer to like parts, the automobile or other vehicle or the like indicated in its entirety at A and the top indicated in its entirety at T may be of any conventional character. The top T is provided with the usual frame or side rails 10 having pivotal connections 12 at suitable points to permit folding or collapsing.

Figure 3:
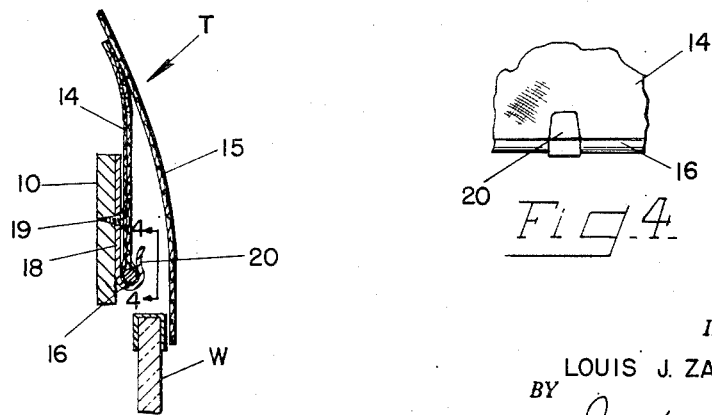
Fig. 3 is an enlarged vertical sectional view taken along the line 3—3 of Fig. 1.

The top T, in accordance with the invention, is provided with a skirt 14 of cloth or the like which preferably is sewn to the inner face of the top along its opposed side edge portions but short of the free side edge extremities 15 of the top which, as best shown in Fig. 3, depend outwardly beyond the skirt member 14 so as to carry rain water outwardly beyond the automobile window W and to prevent the ingress of rain water or wind over the top of the window. A welt 16 is preferably sewn within a seam provided at the bottom extremity of the skirt 14 in the usual manner as is also best shown in Fig. 3.

For receiving the free welted edge of the skirt 14 thus to secure the side edges of the top T to the side rails 10, strips 18, preferably of metal, are provided and are formed with apertures at suitable points along their length for the reception of sheet metal screws or the like 19 for securing the strips to the outer faces of the frame or side rails 10. A plurality of clip members 20 are carried by the lower edges of the strips 18, preferably formed integrally therewith, and are upwardly bent in substantially closed U-shaped cross-sectional configuration to receive the welted bottom edge 16 of the skirt 14 either by endwise insertion or by transverse insertion against the spring tension of the clips 20.

Figure 1:
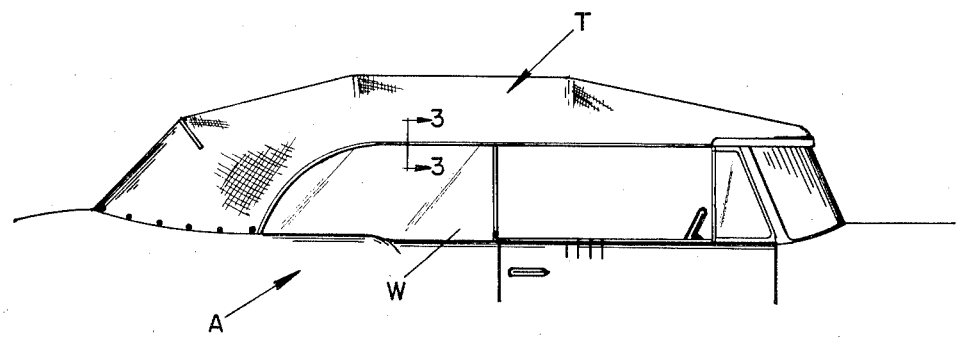
Fig. 1 is a side elevational view of a convertible top secured to an automobile, indicated in fragment, in accordance with the invention and shown in raised or closed position.
Figure 2:
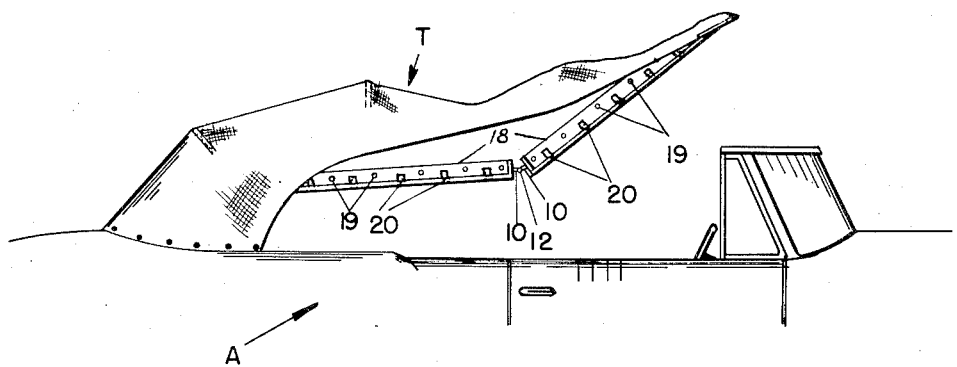
Fig. 2 is a view similar to Fig. 1 but showing the top in partially raised position with its side edges detached from the retaining clips which appear in side elevation.

As apparent from Fig. 2, separate strip sections 18 are provided forwardly and rearwardly of the hinge connections 12 for the top frame sections 10 so as to cause no interference with the ordinary folding or collapsing of these frame sections and the concurrent folding or collapsing of the top T. Ordinarily, the front end of the forward strip may be positioned about three or four inches from the forward end of the vehicle top, approximately above the rear of the front wing window, and the rearward strip may extend back to about four or five inches from the first joint in the rear of the top frame member 10 or above the rear wing window. The skirt 14, however, may extend further rearwardly for weather sealing.

Figure 4:
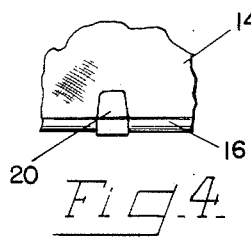
Fig. 4 is a fragmentary side elevational view taken along the line 4—4 of Fig. 3 and showing the top edge secured in one of the retaining clips.

The clip members 20, as shown best in Fig. 4, are preferably somewhat narrower at the top than at the bottom so as to afford greater strength at the bottom and sufficient resiliency for insertion of the welted edge 16 through the top of the clip. For example, in one particularly efficient embodiment of the invention the clips 20 are ⅜ inch in width at the bottom and 5/16 inch in width at their upper free end portions.

It will be apparent from the foregoing that my invention provides a very simple and efficient convertible top connecting means which may be employed with practically all kinds of vehicles and flexible collapsible tops for securely yet removably retaining the top and for providing a weather tight seal between the side edges of the top and the vehicle window. The principles of the present invention are also applicable for uses other than with vehicle and convertible top assemblies as will be apparent to those skilled in the art.

It will be understood that the invention is not confined to the precise construction and arrangement of parts herein illustrated and described but embraces all such modifications thereof as come within the scope of the following claims.

I claim:

1. In combination, a vehicle convertible top having opposed elongated side rail members, opposed depending skirt members secured to the inner side faces of said top and terminating short of the opposed side extremities thereof, welted free bottom edges for said skirt members, a plurality of strips, means securing said strips along the lengths of portions of said side rail members and a plurality of spaced upright clips carried by the lower edges of said strips, the said clips receiving and removably securing the adjacent welted bottom edges of said skirt members and the side extremities of said top extending outwardly of and overlapping the secured bottom edges of said skirt members.

2. Concealed means for securing an elongated edge portion of a cover to an elongated rail member which comprises, a depending skirt member adapted to be secured to the inner face of said elongated edge portion and terminating short of the edge extremity of said cover, a welted free bottom edge for said skirt member, a strip member, means for securing said strip member substantially lengthwise of said elongated rail member and a plurality of spaced upright clips carried by said strip member for receiving and removably securing the welted bottom edge of said skirt member, the edge extremity of said cover being adapted to overlap and conceal the secured bottom edge of said skirt member.

References Cited in the file of this patent

UNITED STATES PATENTS

| | | |
|---|---|---|
| 1,045,861 | Loomis | Dec. 3, 1912 |
| 1,447,191 | Vetter | Mar. 6, 1923 |
| 2,042,431 | Hooper | May 26, 1936 |
| 2,390,193 | Tandetzke | Dec. 4, 1945 |
| 2,418,918 | Yonkers | Apr. 15, 1947 |
| 2,664,309 | Kavalar | Dec. 29, 1953 |